United States Patent
Pydin et al.

(10) Patent No.: US 12,461,526 B2
(45) Date of Patent: Nov. 4, 2025

(54) AUTONOMOUS MOBILE BODY CONTROL DEVICE, AUTONOMOUS MOBILE BODY, AND AUTONOMOUS MOBILE BODY CONTROL METHOD

(71) Applicant: HONDA MOTOR CO., LTD., Tokyo (JP)

(72) Inventors: Andrii Pydin, Wako (JP); Shinta Aonuma, Wako (JP); Shintaro Hidaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 18/088,831

(22) Filed: Dec. 27, 2022

(65) Prior Publication Data

US 2023/0205209 A1    Jun. 29, 2023

(30) Foreign Application Priority Data

Dec. 28, 2021 (JP) ................. 2021-213682

(51) Int. Cl.
  *G05D 1/00*    (2024.01)
(52) U.S. Cl.
  CPC ......... *G05D 1/0212* (2013.01); *G05D 1/0246* (2013.01); *G05D 1/0274* (2013.01); *G05D 1/0278* (2013.01)
(58) Field of Classification Search
  CPC .. G05D 1/0212; G05D 1/0246; G05D 1/0274; G05D 1/0278
  See application file for complete search history.

(56) References Cited

U.S. PATENT DOCUMENTS

| 2019/0018859 | A1* | 1/2019 | Miyaoka | G06Q 50/10 |
| 2021/0397191 | A1* | 12/2021 | Nakai | G05D 1/0217 |
| 2022/0082403 | A1* | 3/2022 | Shapira | G06V 20/58 |

FOREIGN PATENT DOCUMENTS

| CN | 110910511 A | * | 3/2020 | ............ G06F 3/013 |
| JP | 5012615 |  | 8/2012 | |
| JP | 2015-141580 |  | 8/2015 | |
| JP | 2020-034471 |  | 3/2020 | |
| WO | 2020/049945 |  | 3/2020 | |

OTHER PUBLICATIONS

English translation of CN 110910511 A (Year: 2025).*

* cited by examiner

*Primary Examiner* — Scott A Browne
*Assistant Examiner* — Shahira Baajour
(74) *Attorney, Agent, or Firm* — Amin, Turocy & Watson, LLP

(57) ABSTRACT

An autonomous mobile body control device includes a control unit that is capable of executing a first movement control that controls movement of an autonomous mobile body on the basis of a main map, and a second movement control that controls the movement of the autonomous mobile body on the basis of a local map. In the case that a map used when causing the autonomous mobile body to move is switched from the main map to the local map, or alternatively, in the case that the map used when causing the autonomous mobile body to move is switched from the local map to the main map, the control unit temporarily executes a third movement control that controls the movement of the autonomous mobile body on the basis of a landmark appearing in an acquired image.

14 Claims, 8 Drawing Sheets

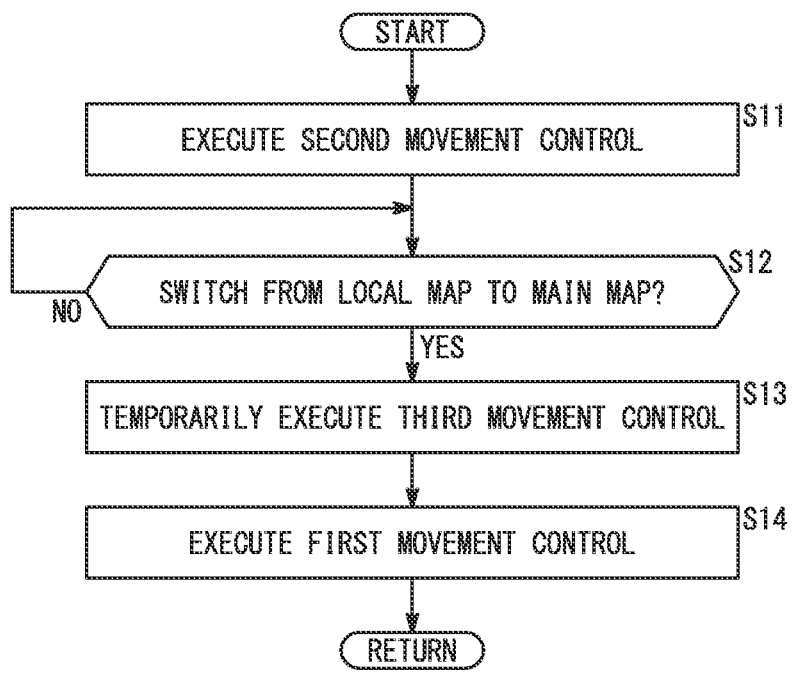

AUTONOMOUS MOBILE BODY CONTROL DEVICE, AUTONOMOUS MOBILE BODY, AND AUTONOMOUS MOBILE BODY CONTROL METHOD

CROSS-REFERENCE TO RELATED APPLICATIONS

This application is based upon and claims the benefit of priority from Japanese Patent Application No. 2021-213682 filed on Dec. 28, 2021, the contents of which are incorporated herein by reference.

BACKGROUND OF THE INVENTION

Field of the Invention

The present invention relates to an autonomous mobile body control device, an autonomous mobile body, and an autonomous mobile body control method.

Description of the Related Art

In JP 2020-034471 A, it is disclosed that under predetermined conditions in which positioning of a vehicle in a satellite positioning system is insufficient, the position of the vehicle is determined on the basis of an alternative positioning method that does not rely on satellites.

SUMMARY OF THE INVENTION

However, the technique disclosed in JP 2020-034471 A merely discloses that, in the case that the positioning of a vehicle in the satellite positioning system is insufficient, the position of the vehicle is determined on the basis of the alternative positioning method that does not rely on satellites. A technique that can more satisfactorily control the movement of an autonomous mobile body has been long awaited.

The present invention has the object of solving the aforementioned problem.

An autonomous mobile body control device according to one aspect of the present invention comprises a position information acquisition unit configured to acquire position information indicating a position of an autonomous mobile body using a satellite positioning system, an image acquisition unit configured to acquire an acquired image which is an image acquired by an image capturing unit provided in the autonomous mobile body, and a control unit configured to execute a first movement control that controls movement of the autonomous mobile body on a basis of main map information including a main map, and a second movement control that controls the movement of the autonomous mobile body on a basis of local map information including a local map, wherein, in a case that a map used when causing the autonomous mobile body to move is switched from the main map to the local map, or alternatively, in a case that the map used when causing the autonomous mobile body to move is switched from the local map to the main map, the control unit temporarily executes a third movement control that controls the movement of the autonomous mobile body on a basis of a landmark appearing in the acquired image.

An autonomous mobile body according to another aspect of the present invention comprises the above-described autonomous mobile body control device.

An autonomous mobile body control method according to still another aspect of the present invention comprises a step of executing a first movement control that controls movement of an autonomous mobile body on a basis of main map information including a main map, a step of executing a second movement control that controls the movement of the autonomous mobile body on a basis of local map information including a local map, and a step of executing a third movement control that controls the movement of the autonomous mobile body on a basis of a landmark appearing in an acquired image which is an image acquired by an image capturing unit provided in the autonomous mobile body, in a case that a map used when causing the autonomous mobile body to move is switched from the main map to the local map, or alternatively, in a case that the map used when causing the autonomous mobile body to move is switched from the local map to the main map.

According to the present invention, the autonomous mobile body control device, which can satisfactorily control movement of the autonomous mobile body, the autonomous mobile body, and the autonomous mobile body control method can be provided.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a flow chart showing an example of operations of the autonomous mobile body control device according to the embodiment.

DETAILED DESCRIPTION OF THE INVENTION

Embodiment

Figure 1:
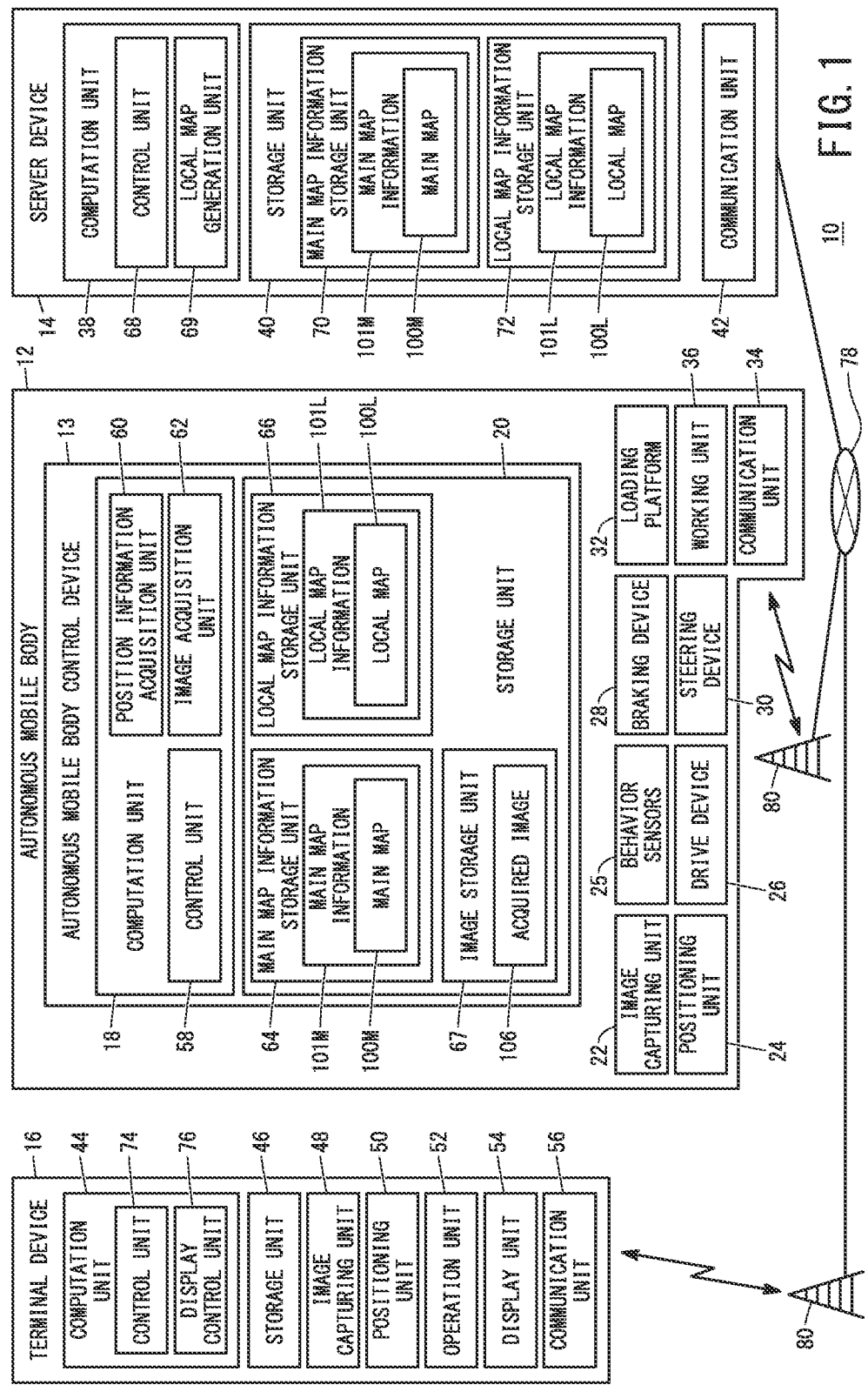
FIG. 1 is a block diagram illustrating a system according to an embodiment.

A description will be presented below with reference to the accompanying drawings concerning an autonomous mobile body control device, an autonomous mobile body, and an autonomous mobile body control method according to one embodiment of the present invention. FIG. 1 is a block diagram illustrating a system according to the present embodiment.

Although a system 10 according to the present embodiment can be constituted by an autonomous mobile body 12, a server device 14, and a terminal device 16, the present invention is not limited to this feature. The autonomous mobile body 12, for example, is a vehicle, although the present invention is not limited to this feature. The terminal device 16, for example, is a portable communication terminal (a mobile terminal), although the present invention is not limited to this feature. As the portable communication terminal, there may be cited, for example, a smart phone or the like, although the present invention is not limited to this feature. The terminal device 16 can be a device that is possessed by a user, although the present invention is not limited to this feature.

The autonomous mobile body 12 can be equipped with an autonomous mobile body control device 13, an image capturing unit 22, a positioning unit 24, behavior sensors 25, a drive device 26, a braking device 28, a steering device 30, a loading platform 32, and a communication unit 34. The autonomous mobile body 12 may be further equipped with a working unit 36. It should be noted that, although the autonomous mobile body 12 may include constituent elements other than these constituent elements, descriptions of such other elements are omitted herein.

The autonomous mobile body control device 13 can be equipped with a computation unit 18 and a storage unit 20. The computation unit 18 can be constituted by a processor such as a CPU (Central Processing Unit) and a GPU (Graphics Processing Unit). More specifically, the computation unit 18 can be constituted by processing circuitry. The computation unit 18 can be equipped with a control unit 58, a position information acquisition unit 60, and an image acquisition unit 62. The control unit 58, the position information acquisition unit 60, and the image acquisition unit 62 can be realized by programs stored in the storage unit 20 being executed by the computation unit 18. The control unit 58 administers the control of the autonomous mobile body 12 as a whole. Moreover, it should be noted that, although the computation unit 18 may include constituent elements other than these constituent elements, descriptions of such other elements are omitted herein.

Moreover, it should be noted that at least a portion of the control unit 58, the position information acquisition unit 60, and the image acquisition unit 62 may be implemented by an integrated circuit such as an ASIC (Application Specific Integrated Circuit) and an FPGA (Field-Programmable Gate Array). Further, at least a portion of the control unit 58, the position information acquisition unit 60, and the image acquisition unit 62 may be constituted by an electronic circuit including a discrete device.

The storage unit 20 can be equipped with a non-illustrated volatile memory and a non-illustrated non-volatile memory. As the volatile memory, there may be cited, for example, a RAM (Random Access Memory). The volatile memory is used as a working memory of the processor, and temporarily stores data or the like required for processing or calculations. As the non-volatile memory, there may be cited, for example, a ROM (Read Only Memory), a flash memory, or the like. The non-volatile memory is used as a storage memory, and stores therein programs, tables, maps, and the like. At least a portion of the storage unit 20 may be provided in the processor, the integrated circuit, or the like, which are described above. An application program for causing the computer provided in the autonomous mobile body 12 to execute the autonomous mobile body control method according to the present embodiment is installed in advance in the storage unit 20. Further, a main map information storage unit 64, a local map information storage unit 66, and an image storage unit 67 can be provided in the storage unit 20. Main map information 101M, which will be described later, can be stored in the main map information storage unit 64. Local map information 101L, which will be described later, can be stored in the local map information storage unit 66. An acquired image 106, which is an image acquired by the image acquisition unit 62, can be stored in the image storage unit 67. Although a plurality of acquired images 106 are capable of being stored in the image storage unit 67, only one acquired image 106 is illustrated in FIG. 1.

Figure 2:
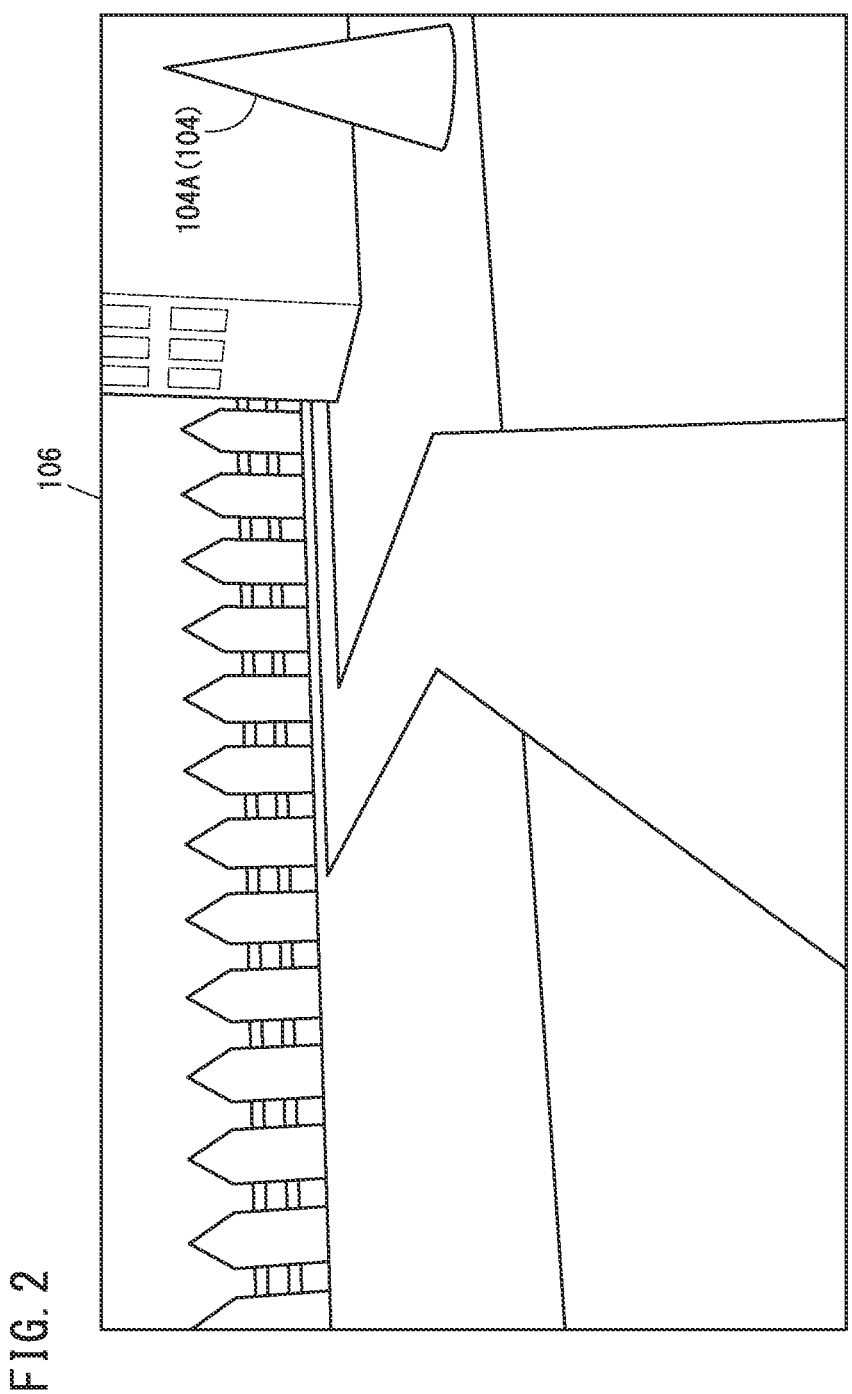
FIG. 2 is a diagram showing an example of an acquired image.

As noted previously, the image capturing unit (a camera) 22 can be provided in the autonomous mobile body 12. The image capturing unit 22 can capture images of the periphery surrounding the autonomous mobile body 12. As the image capturing unit 22, for example, a camera that is capable of acquiring two-dimensional information can be used, although the present invention is not limited to this feature. As the image capturing unit 22, for example, a camera that is capable of acquiring three-dimensional information may also be used. The acquired image 106, which is an image acquired by the image capturing unit 22, is supplied from the image capturing unit 22 to the image acquisition unit 62. FIG. 2 is a diagram showing an example of an acquired image. An example of the acquired image 106 in which a landmark 104 or the like appears is shown in FIG. 2. The image acquisition unit 62 is capable of acquiring the acquired image 106 obtained by the image capturing unit 22. The acquired image 106 may be a moving image, or may be a still image. Although one image capturing unit 22 is illustrated in FIG. 1, a plurality of the image capturing units 22 can be provided. The orientation of the image capturing unit 22 can be adjusted by a non-illustrated actuator.

The autonomous mobile body 12 may further include a non-illustrated radar. The radar emits transmission waves toward the exterior of the autonomous mobile body 12 and receives reflected waves of the emitted transmission waves that are reflected back by a detected object. As the transmission waves, for example, there may be cited electromagnetic waves. As the electromagnetic waves, for example, there may be cited millimeter waves, although the present invention is not limited to this feature. As the detected object, for example, there may be cited a moving object or the like other than the autonomous mobile body 12, although the present invention is not limited to this feature. The radar generates radar information (reflected wave signals) based on the reflected waves and the like. The radar supplies the generated radar information to the control unit 58.

A non-illustrated LiDAR (Light Detection And Ranging, Laser Imaging Detection And Ranging) may further be provided in the autonomous mobile body 12. The LiDAR continuously emits a laser in all directions of the autonomous mobile body 12, measures three-dimensional positions of reflection points on the basis of reflected waves of the emitted laser, and outputs information (three-dimensional information) concerning the three-dimensional positions. The LiDAR supplies the three-dimensional information (LiDAR information) to the control unit 58.

As noted previously, the positioning unit 24 can be provided in the autonomous mobile body 12. The positioning unit 24 can be equipped with a GNSS (Global Navigation Satellite System) sensor. Using a satellite positioning system, the GNSS sensor acquires position information indicating the current position of the autonomous mobile body 12. The position information acquired by the positioning unit 24 is supplied to the position information acquisition unit 60. The position information acquisition unit 60 can acquire the position information supplied from the positioning unit 24.

As noted previously, the behavior sensors 25 can be provided in the autonomous mobile body 12. The behavior sensors 25 acquire information (behavior information) in relation to the behavior of the autonomous mobile body 12. A non-illustrated speed sensor, a non-illustrated wheel speed sensor, a non-illustrated acceleration sensor, and a non-illustrated yaw rate sensor can be included in the behavior sensors 25. The speed sensor can detect the speed (vehicle speed) of the autonomous mobile body 12. The speed sensor can further detect a traveling direction of the autonomous mobile body 12. The wheel speed sensor can detect the speed (wheel speed) of non-illustrated wheels. The acceleration sensor can detect the acceleration of the autonomous mobile body 12. The acceleration includes a longitudinal acceleration, a lateral acceleration, and a vertical acceleration. The yaw rate sensor can detect a yaw rate of the autonomous mobile body 12.

As noted previously, the autonomous mobile body 12 can be equipped with the drive device (a drive power control system) 26. A non-illustrated drive ECU (Electronic Control Unit), and a non-illustrated drive source are provided in the drive device 26. By controlling the drive source, the drive ECU is capable of controlling a drive power for driving the autonomous mobile body 12. As the drive source, for example, there may be cited an engine, a motor, or the like. The drive ECU is capable of controlling the drive power by controlling the drive source on the basis of commands supplied from the control unit 58. The drive power supplied from the drive source can be transmitted to the non-illustrated wheels.

As noted previously, the autonomous mobile body 12 can be equipped with the braking device (a braking force control system) 28. A non-illustrated brake ECU, and a non-illustrated brake mechanism can be provided in the braking device 28. The brake mechanism operates a braking member by means of a brake motor, a hydraulic mechanism, or the like. The brake ECU is capable of controlling the braking force by controlling the brake mechanism on the basis of commands supplied from the control unit 58.

As noted previously, the autonomous mobile body 12 can be equipped with the steering device (a steering system) 30. A non-illustrated steering ECU, and a non-illustrated steering motor can be provided in the steering device 30. The steering ECU controls the orientation of the wheels (steering wheels) by controlling the steering motor on the basis of commands supplied from the control unit 58.

As noted previously, the loading platform 32 can be provided in the autonomous mobile body 12. For example, a non-illustrated package can be loaded onto the loading platform 32.

As noted previously, the autonomous mobile body 12 may be further equipped with the working unit 36. The working unit 36 is capable of performing work determined in advance, for example.

As noted previously, the communication unit 34 can be provided in the autonomous mobile body 12. The communication unit 34 is equipped with, for example, a non-illustrated communication module. Using the communication unit 34, the autonomous mobile body 12 is capable of carrying out communications with the server device 14. More specifically, the autonomous mobile body 12 can carry out communications with the server device 14 via a network 78 and a wireless relay station 80. Using the communication unit 34, the autonomous mobile body 12 is capable of carrying out communications with the terminal device 16. More specifically, the autonomous mobile body 12 can carry out communications with the terminal device 16 via the network 78 and the wireless relay station 80. Further, the autonomous mobile body 12 and the terminal device 16 can carry out short-range wireless communications. As the concerned short-range wireless communications, for example, there may be cited short-range communications based on the Bluetooth (registered trademark) standard or the like. Further, the autonomous mobile body 12 and the terminal device 16 can carry out communications, for example, using a wireless LAN (Local Area Network). More specifically, the autonomous mobile body 12 and the terminal device 16 can carry out wireless communications, for example, based on the Wi-Fi (registered trademark) standard or the like.

The server device 14 can be equipped with a computation unit 38, a storage unit 40, and a communication unit 42. It should be noted that, although the server device 14 may include constituent elements other than these constituent elements, descriptions of such other elements are omitted herein.

The computation unit 38 can be constituted by a processor such as a CPU and a GPU. More specifically, the computation unit 38 can be constituted by processing circuitry. The computation unit 38 can be equipped with a control unit 68 and a local map generation unit 69. The control unit 68 administers the control of the server device 14 as a whole. The control unit 68 and the local map generation unit 69 can be realized by programs stored in the storage unit 40 being executed by the computation unit 38. Moreover, it should be noted that, although the computation unit 38 may include constituent elements other than these constituent elements, descriptions of such other elements are omitted herein. Moreover, at least a portion of the control unit 68 and the local map generation unit 69 may be realized by an integrated circuit such as an ASIC and an FPGA. Further, at least a portion of the control unit 68 and the local map generation unit 69 may be constituted by an electronic circuit including a discrete device.

The storage unit 40 can be equipped with a non-illustrated volatile memory and a non-illustrated non-volatile memory. As the volatile memory, there may be cited, for example, a RAM. The volatile memory is used as a working memory of the processor, and temporarily stores data or the like required for processing or calculations. As the non-volatile memory, there may be cited, for example, a ROM, a flash memory, or the like. The non-volatile memory is used as a storage memory, and stores therein programs, tables, maps, and the like. At least a portion of the storage unit 40 may be provided in the processor, the integrated circuit, or the like, which are described above. Further, the storage unit 40 can be further equipped with an HDD (Hard Disk Drive), an SSD (Solid State Drive), or the like. An application program for causing a computer provided in the server device 14 to execute a predetermined process is installed in advance in the storage unit 40. A main map information storage unit 70 and a local map information storage unit 72 can be provided in the storage unit 40. The main map information 101M, which will be described later, can be stored in the main map information storage unit 70. The local map information 101L, which will be described later, can be stored in the local map information storage unit 72.

The communication unit 42 can be equipped with, for example, a non-illustrated communication module. Using the communication unit 42, the server device 14 is capable of carrying out communications with the autonomous mobile body 12. Using the communication unit 42, the server device 14 is capable of carrying out communications with the terminal device 16.

The terminal device 16 can be equipped with a computation unit 44, a storage unit 46, an image capturing unit 48, a positioning unit 50, an operation unit 52, a display unit 54, and a communication unit 56. Although the terminal device 16 may include constituent elements other than these constituent elements, descriptions of such other elements are omitted herein.

The computation unit 44 can be constituted by a processor, such as a CPU and a GPU. More specifically, the computation unit 44 can be constituted by processing circuitry. The computation unit 44 can be equipped with a control unit 74 and a display control unit 76. The control unit 74 and the display control unit 76 can be realized by programs stored in the storage unit 46 being executed by the computation unit 44. The control unit 74 administers the control of the terminal device 16 as a whole. The display control unit 76 administers the control of a display on the display unit 54. Moreover, it should be noted that although the computation unit 44 may include constituent elements other than these constituent elements, descriptions of such other elements are omitted herein. Moreover, at least a portion of the control unit 74 and the display control unit 76 may be realized by an integrated circuit such as an ASIC and an FPGA. Further, at least a portion of the control unit 74 and the display control unit 76 may be constituted by an electronic circuit including a discrete device.

The storage unit 46 can be equipped with a non-illustrated volatile memory and a non-illustrated non-volatile memory. As the volatile memory, there may be cited, for example, a RAM. The volatile memory is used as a working memory of the processor, and temporarily stores data or the like required for processing or calculations. As the non-volatile memory, there may be cited, for example, a ROM, a flash memory, or the like. The non-volatile memory is used as a storage memory, and stores therein programs, tables, maps, and the like. At least a portion of the storage unit 46 may be provided in the processor, the integrated circuit, or the like, which are described above. An application program for causing a computer provided in the terminal device 16 to execute a predetermined process is installed in advance in the storage unit 46.

The image capturing unit (a camera) 48 can capture images of the periphery surrounding the terminal device 16. As the image capturing unit 48, for example, a camera that is capable of acquiring two-dimensional information can be used, although the present invention is not limited to this feature. As the image capturing unit 48, for example, a camera that is capable of acquiring three-dimensional information may also be used. The images acquired by the image capturing unit 48 can be supplied to the server device 14, for example. The server device 14 is capable of acquiring the images acquired by the image capturing unit 48. In the case that the image capturing unit 48 is capable of acquiring three-dimensional information, the images include information indicating the distance to an object. The images acquired by the image capturing unit 48 may be moving images, or may be still images.

The positioning unit 50 can be equipped with a GNSS sensor. Using a satellite positioning system, the GNSS sensor can acquire position information indicating the current position of the terminal device 16.

The operation unit 52 can be used when an operation input is performed with respect to the terminal device 16. A non-illustrated display element can be provided in the display unit 54. As such a display element, there may be used, for example, a liquid crystal display element, an organic electroluminescence display element, or the like. The operation unit 52 and the display unit 54 can be constituted by a non-illustrated touch panel that is equipped with such a display element.

The communication unit 56 can be equipped with, for example, a non-illustrated communication module. Using the communication unit 56, the terminal device 16 is capable of carrying out communications with the autonomous mobile body 12. Using the communication unit 56, the terminal device 16 is capable of carrying out communications with the server device 14. As noted previously, the terminal device 16 is capable of carrying out short-range wireless communications with the autonomous mobile body 12. Further, as noted previously, the terminal device 16 is capable of carrying out communications with the autonomous mobile body 12 using, for example, a wireless LAN.

When the autonomous mobile body 12 is made to move, for example, the position information and the map information can be used. The position information, in the manner described above, indicates the current position of the autonomous mobile body 12. The main map information 101M including a main map 100M, and the local map information 101L including a local map 100L can be included in the map information. The main map 100M is a general map. The local map 100L is a map in relation to a specific area. The local map 100L, for example, is a map of privately owned land, although the present invention is not limited to this feature.

The local map 100L can be generated using SLAM (Simultaneous Localization and Mapping) technology, for example, although the present invention is not limited to this feature. Such SLAM technology involves a technique for simultaneously estimating the position of a mobile body and creating an environmental map. As noted previously, the terminal device 16 is provided with the positioning unit 50 and the image capturing unit 48. Therefore, the terminal device 16 can acquire the position information and the image information. Therefore, using the terminal device 16, it is possible to acquire information for generating the local map 100L. However, the information processing load at the time when the local map 100L is generated is comparatively large. Therefore, generation of the local map 100L can be carried out by the server device 14 or the like, for example. More specifically, the acquisition of information for generating the local map 100L can be carried out by the terminal device 16, and the generation of the local map 100L can be carried out by the server device 14 on the basis of the information supplied from the terminal device 16. Moreover, the generation of the local map 100L may be carried out by using a dedicated device for the purpose of generating the local map 100L.

Figure 3:
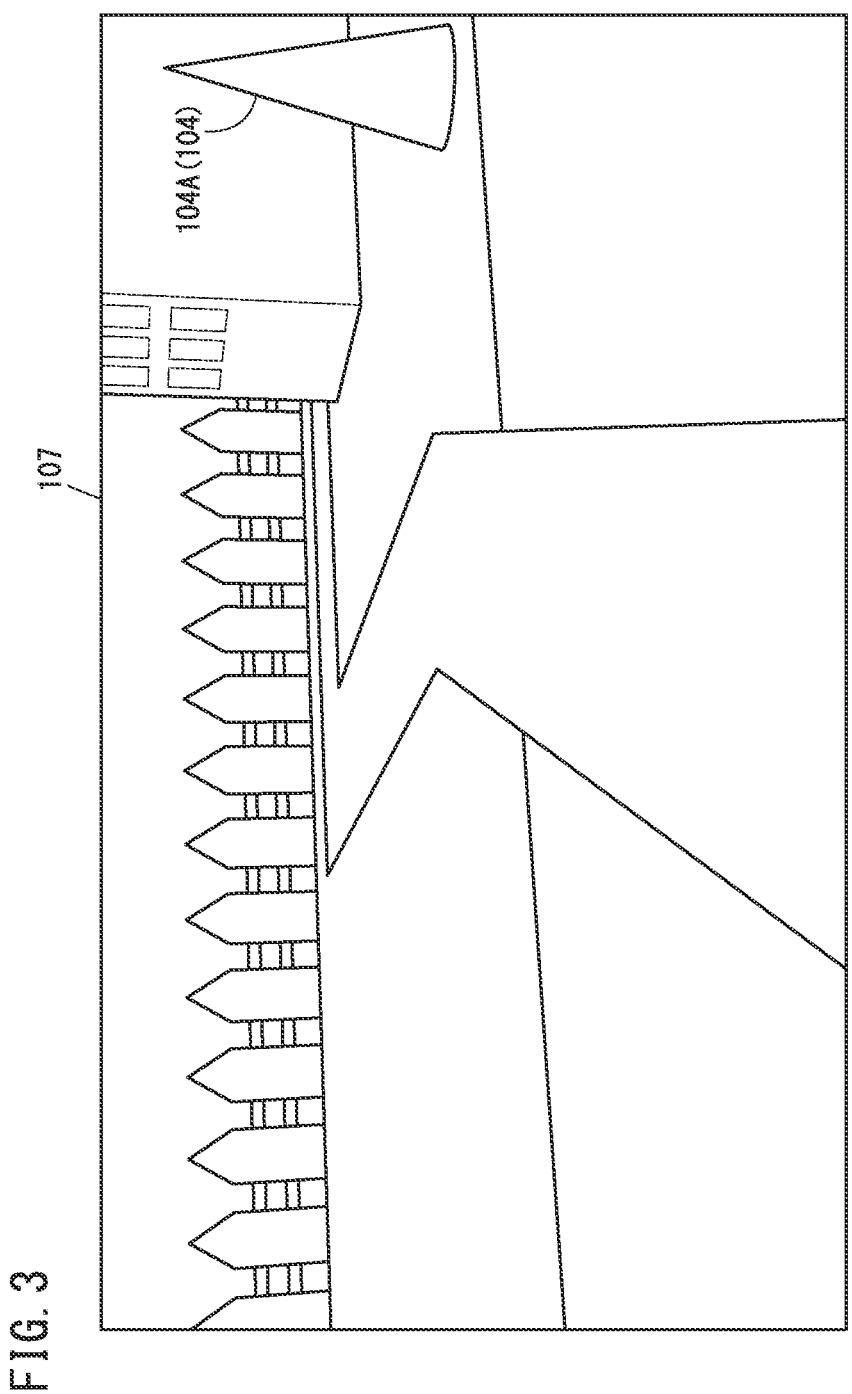
FIG. 3 is a diagram showing an example of a provided image.

As noted previously, the server device 14 can be equipped with the local map generation unit 69. The local map generation unit 69 is capable of generating the local map information 101L on the basis of provided information, which is information provided from the terminal device 16. This provided information can include a provided image 107, which is an image provided from the terminal device 16. FIG. 3 is a diagram showing an example of a provided image. An example of the provided image 107 in which the landmark 104 appears is shown in FIG. 3. The provided image 107 can be acquired by capturing an image of a specific area. Although the provided image 107 can be acquired, for example, using the terminal device 16, the present invention is not limited to this feature. Although the provided image 107 can be composed of, for example, a moving image or the like, the present invention is not limited to this feature. In the provided information, there can further be included image capturing position information, which is information indicating a position where image capturing has been carried out in order to acquire the provided image 107.

Since the image capturing position information and the provided image 107 can be provided to the local map generation unit 69, the local map generation unit 69 is capable of generating the local map information 101L on the basis of such items of information.

The local map generation unit 69 is capable of extracting a landmark (a marking on the land) 104 from the provided image 107 provided from the terminal device 16. Reference numeral 104 is used when a description is made without distinguishing individual landmarks, and reference numerals 104A and 104B (refer to FIGS. 5 and 6) are used to distinguish and describe individual landmarks. The local map generation unit 69 can include information concerning the extracted landmark 104 in the local map information 101L. The local map generation unit 69 can store the local map information 101L generated by the local map generation unit 69 in the local map information storage unit 72.

The local map generation unit 69 can include, in the local map information 101L, information indicating a movement rule used when the autonomous mobile body 12 is made to move inside an area 103L (refer to FIG. 5) covered by the local map 100L. As the movement rule, for example, there may be cited a temporary stop, a speed limit, or the like, although the present invention is not limited to this feature. Information in relation to the movement rule can be included in the provided information provided from the terminal device 16 to the server device 14, for example. The information in relation to the movement rule can be entered by the user, for example. For example, an application screen for inputting the movement rule can be displayed on the display unit 54 provided in the terminal device 16. Inputting of the movement rule can be carried out by the application screen being operated by the user. The terminal device 16 can supply the information indicating the movement rule to the server device 14. Based on the information supplied from the terminal device 16, the local map generation unit 69 can include, in the local map information 101L, the information indicating the movement rule.

The local map 100L may be a map of a working area where work is performed using the working unit 36. The local map generation unit 69 can include, in the local map information 101L, information indicating a work rule used when work is carried out by the working unit 36. Information in relation to the work rule can be included in the provided information provided from the terminal device 16 to the server device 14, for example. The information in relation to the work rule can be entered by the user, for example. For example, an application screen for inputting the work rule can be displayed on the display unit 54 provided in the terminal device 16. Inputting of the work rule can be carried out by the application screen being operated by the user. The terminal device 16 can supply the information indicating the work rule to the server device 14. Based on the information supplied from the terminal device 16, the local map generation unit 69 can include, in the local map information 101L, the information indicating the work rule.

As noted previously, the storage unit 40 provided in the server device 14 can be equipped with the main map information storage unit 70. The main map information 101M including the main map 100M is stored in the main map information storage unit 70. A general map created by a company that carries out creation of the map information can be used as the main map 100M, although the present invention is not limited to this feature.

The control unit 68 provided in the server device 14 is capable of supplying the main map information 101M to the autonomous mobile body 12. More specifically, using the communication unit 42, the control unit 68 is capable of supplying the main map information 101M stored in the main map information storage unit 70 to the autonomous mobile body 12.

The control unit 68 provided in the server device 14 is capable of supplying the local map information 101L to the autonomous mobile body 12. More specifically, using the communication unit 42, the control unit 68 is capable of supplying the local map information 101L stored in the local map information storage unit 72 to the autonomous mobile body 12.

As noted previously, the control unit 58 can be provided in the autonomous mobile body control device 13 provided in the autonomous mobile body 12. The control unit 58 is capable of storing, in the main map information storage unit 64 provided in the autonomous mobile body 12, the main map information 101M supplied from the server device 14. Moreover, in this instance, a case has been described as an example in which the main map information 101M supplied from the server device 14 is stored in the main map information storage unit 64, although the present invention is not limited to this feature. For example, the autonomous mobile body 12 may acquire the main map information 101M without the intervention of the server device 14.

The control unit 58 provided in the autonomous mobile body control device 13 is capable of storing, in the local map information storage unit 66 provided in the autonomous mobile body 12, the local map information 101L supplied from the server device 14. Moreover, in this instance, a case has been described as an example in which the local map information 101L supplied from the server device 14 is stored in the local map information storage unit 66, although the present invention is not limited to this feature. For example, the autonomous mobile body 12 may acquire the local map information 101L without the intervention of the server device 14. The local map 100L can be partially combined with the main map 100M.

The control unit 58 provided in the autonomous mobile body control device 13 is capable of executing a first movement control. The first movement control is a control for causing the autonomous mobile body 12 to move on the basis of the main map information 101M including the main map 100M. When executing the first movement control, the control unit 58 causes the autonomous mobile body 12 to move on the basis of the main map information 101M stored in the main map information storage unit 64. The control unit 58 causes the autonomous mobile body 12 to move on the basis of the position information indicating the position of the autonomous mobile body 12, and the main map information 101M. As noted previously, the position information indicating the position of the autonomous mobile body 12 can be acquired using the satellite positioning system.

The control unit 58 provided in the autonomous mobile body control device 13 is capable of executing a second movement control. The second movement control is a control for causing the autonomous mobile body 12 to move on the basis of the local map information 101L including the local map 100L. When executing the second movement control, the control unit 58 causes the autonomous mobile body 12 to move on the basis of the local map information 101L stored in the local map information storage unit 66. The control unit 58 is capable of causing the autonomous mobile body 12 to move on the basis of the position information indicating the position of the autonomous mobile body 12, and the local map information 101L. In an outdoor location, it is possible to use the satellite positioning system. Therefore, in an outdoor location, the position information can be acquired using the satellite positioning system. On the other hand, in an indoor location, the satellite positioning system cannot be used. Therefore, in an indoor location, acquisition of the position information in which the satellite positioning system is used cannot be carried out. In the case that the autonomous mobile body 12 is caused to move in an indoor location, since acquisition of the position information in which the positioning system is used cannot be carried out, the control unit 58 can cause the autonomous mobile body 12 to move on the basis of the acquired image 106 acquired by the image acquisition unit 62.

The first movement control is performed inside an area in which the satellite positioning system can be used. On the other hand, the second movement control may be performed inside an area in which the satellite positioning system cannot be used. Accordingly, the frequency at which the control based on the acquired image 106 acquired by the image acquisition unit 62 is performed in the second movement control is higher than the frequency at which the control based on the acquired image 106 acquired by the image acquisition unit 62 is performed in the first movement control.

When the autonomous mobile body 12 that is moving inside an area 103M (refer to FIG. 5) covered by the main map 100M enters the area 103L covered by the local map 100L, a situation arises in which the map used when causing the autonomous mobile body 12 to move needs to be switched from the main map 100M to the local map 100L. For example, in the case that a movement origin (departure point) of the autonomous mobile body 12 is positioned inside the area 103M covered by the main map 100M, and a movement destination (destination point) of the autonomous mobile body 12 is positioned inside the area 103L covered by the local map 100L, the above-described situation occurs in the process of the autonomous mobile body 12 moving from the departure point to the destination point. In the case that the map used when causing the autonomous mobile body 12 to move is switched from the main map 100M to the local map 100L, the control unit 58 is capable of temporarily executing a third movement control. The third movement control is a control for causing the autonomous mobile body 12 to move on the basis of the landmark 104 appearing in the acquired image 106 acquired by the image acquisition unit 62.

In the case that the map used when causing the autonomous mobile body 12 to move is simply switched from the main map 100M to the local map 100L, a case may occur in which the autonomous mobile body 12 may not be able to move quickly. This is because a certain amount of time is required in order to specify the position of the autonomous mobile body 12 on the local map 100L. According to the present embodiment, in the case that the map used when causing the autonomous mobile body 12 to move needs to be switched from the main map 100M to the local map 100L, the third movement control is temporarily executed. As noted previously, the third movement control is a control for causing the autonomous mobile body 12 to move on the basis of the landmark 104 appearing in the image acquired by the image acquisition unit 62. In the third movement control, it is not necessary to use the map information. Therefore, according to the present embodiment, even in the case that the map used when causing the autonomous mobile body 12 to move is switched from the main map 100M to the local map 100L, the autonomous mobile body 12 can be made to move smoothly.

When the autonomous mobile body 12 that is moving inside the area 103L covered by the local map 100L enters the area 103M covered by the main map 100M, the map used when causing the autonomous mobile body 12 to move needs to be switched from the local map 100L to the main map 100M. For example, when the autonomous mobile body 12, which has arrived at a destination point which is positioned inside the area 103L covered by the local map 100L, returns to a starting point that is positioned within the area 103M covered by the main map 100M, the above-described situation occurs in the process of the autonomous mobile body 12 returning from the destination point to the starting point. In the case that the map used when causing the autonomous mobile body 12 to move is switched from the local map 100L to the main map 100M, the control unit 58 temporarily executes the third movement control. As noted previously, the third movement control is a control for causing the autonomous mobile body 12 to move on the basis of the landmark 104 appearing in the acquired image 106 acquired by the image acquisition unit 62.

In the case that the map used when causing the autonomous mobile body 12 to move is simply switched from the local map 100L to the main map 100M, a case may occur in which the autonomous mobile body 12 may not be able to move quickly. This is because a certain amount of time is required in order to specify the position of the autonomous mobile body 12 on the main map 100M. According to the present embodiment, in the case that the map used when causing the autonomous mobile body 12 to move is switched from the local map 100L to the main map 100M, the third movement control is temporarily executed. As noted previously, the third movement control is a control for causing the autonomous mobile body 12 to move on the basis of the landmark 104 appearing in the image acquired by the image acquisition unit 62. In the third movement control, it is not necessary to use the map information. Therefore, according to the present embodiment, even in the case that the map used when causing the autonomous mobile body 12 to move is switched from the local map 100L to the main map 100M, the autonomous mobile body 12 can be made to move smoothly.

Figure 4:
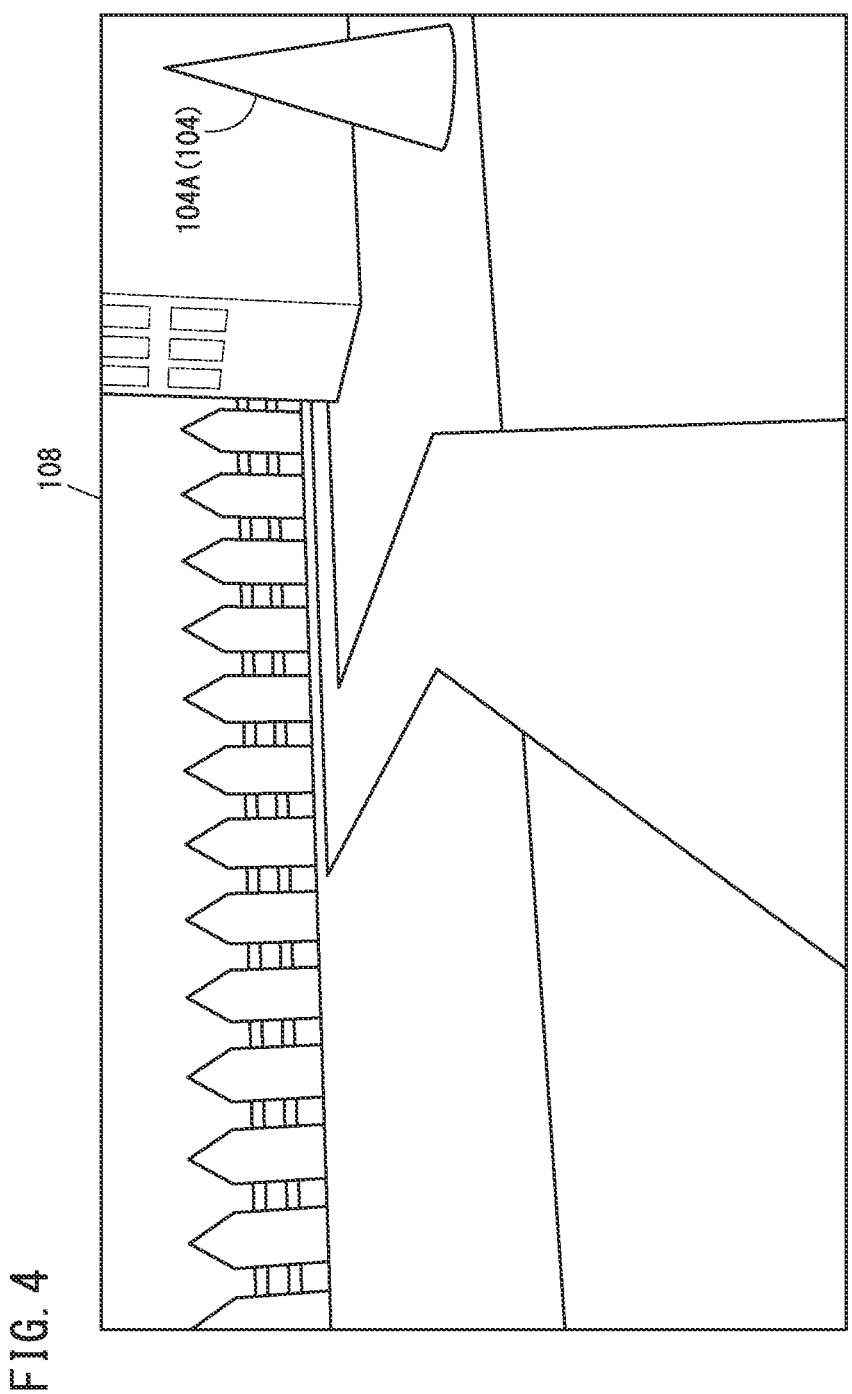
FIG. 4 is a diagram showing an example of a previously acquired image.

Position information indicating the position of a node 102A (refer to FIG. 5) positioned on a movement route, direction information indicating the direction of the landmark 104A that can be seen from the node 102A, and distance information indicating the distance from the node 102A to the landmark 104A can be acquired in advance. For example, in a state in which the autonomous mobile body 12 is positioned at the node 102A (refer to FIG. 5), an image of the landmark 104A (refer to FIG. 5) is captured in advance by the image capturing unit 22 provided in the autonomous mobile body 12, whereby a previously acquired image 108 can be acquired. The previously acquired image 108 is an image acquired in advance at a stage prior to delivery or the like using the autonomous mobile body 12 being carried out. FIG. 4 is a diagram showing an example of a previously acquired image. In this manner, previously acquired information including the previously acquired image 108 is acquired. Moreover, in this instance, although a case has been described as an example in which the previously acquired information is acquired by the autonomous mobile body 12, the present invention is not limited to this feature. The previously acquired information may be acquired by capturing an image of the landmark 104A by the image capturing unit 48 provided in the terminal device 16 in a state in which the terminal device 16 is positioned at the node 102A. Reference numeral 102 is used when a description is made without distinguishing individual nodes, and reference numerals 102A and 102B (refer to FIGS. 5 and 6) are used to distinguish and describe individual nodes.

Direction information indicating the direction of the node 102B (refer to FIG. 5) with respect to the node 102A, and distance information indicating the distance from the node 102A to the node 102B can further be included in the previously acquired information. Such information can be entered by the user, for example. For example, an application screen for inputting such information can be displayed on the display unit 54 provided in the terminal device 16. Inputting of such information can be carried out by the application screen being operated by the user.

Figure 5:
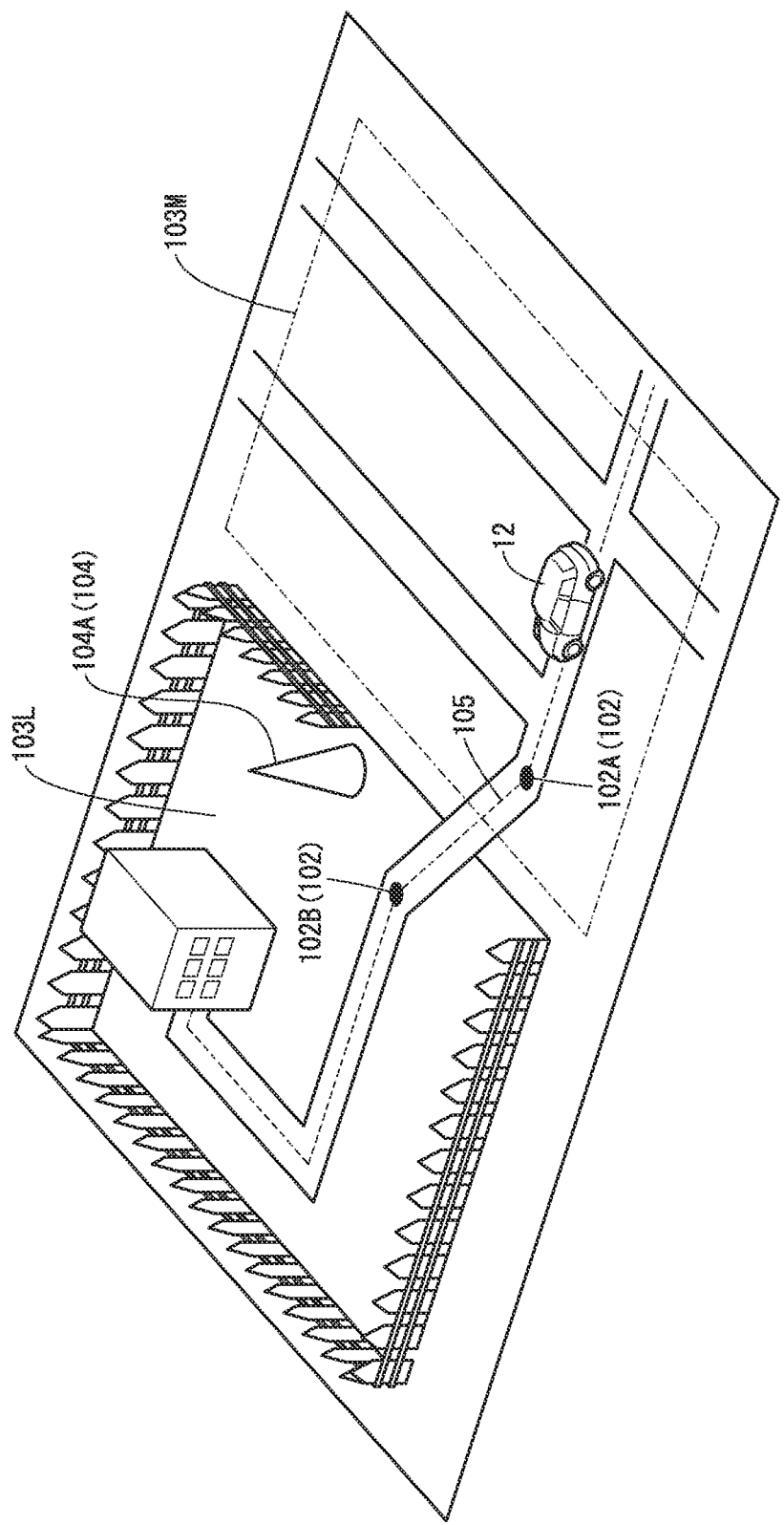
FIG. 5 is a schematic diagram showing an example of a third movement control.

FIG. 5 is a schematic diagram showing an example of the third movement control. FIG. 5 shows a state in which the node 102A positioned inside the area 103M covered by the main map 100M is positioned in front of the autonomous mobile body 12. Further, FIG. 5 shows a state in which the landmark 104A exists. In the third movement control, the control unit 58 may cause the autonomous mobile body 12 to move on a movement route 105 connecting the node 102A positioned inside the area 103M covered by the main map 100M, and the node 102B positioned inside the area 103L covered by the local map 100L. The direction of movement of the autonomous mobile body 12 at the time when the autonomous mobile body 12 is positioned at the node 102A can be determined in the following manner, for example.

More specifically, when the autonomous mobile body 12 is positioned at the node 102A, the position information acquisition unit 60 is capable of acquiring the position information indicating the position of the node 102A. Further, the direction information indicating the direction of the landmark 104A that can be seen from the node 102A can be acquired based on the orientation of the image capturing unit 22, and the direction of the landmark 104A in the acquired image 106. Further, the distance information indicating the distance from the node 102A to the landmark 104A can be acquired, for example, based on the acquired image 106. More specifically, because the distance information can be included in the acquired image 106, the distance information indicating the distance from the node 102A to the landmark 104A can be acquired on the basis of the acquired image 106. In the manner described above, the previously acquired information is acquired in advance. The direction information indicating the direction of the landmark 104A that can be seen from the node 102A, and the distance information indicating the distance from the node 102A to the landmark 104A are included in the previously acquired information. Further, the direction information indicating the direction of the node 102B with respect to the node 102A, and the distance information indicating the distance from the node 102A to the node 102B can further be included in the previously acquired information. By appropriately using these items of information, the control unit 58 is capable of determining the direction of movement of the autonomous mobile body 12. More specifically, the control unit 58 is capable of determining the direction of movement of the autonomous mobile body 12 on the basis of the landmark 104A appearing in the acquired image 106, the direction information indicating the direction of the landmark 104A, and the distance information indicating the distance from the node 102A to the landmark 104A. In other words, with reference to the landmark 104A appearing in the acquired image 106, the control unit 58 is capable of determining the direction of movement of the autonomous mobile body 12.

Figure 6:
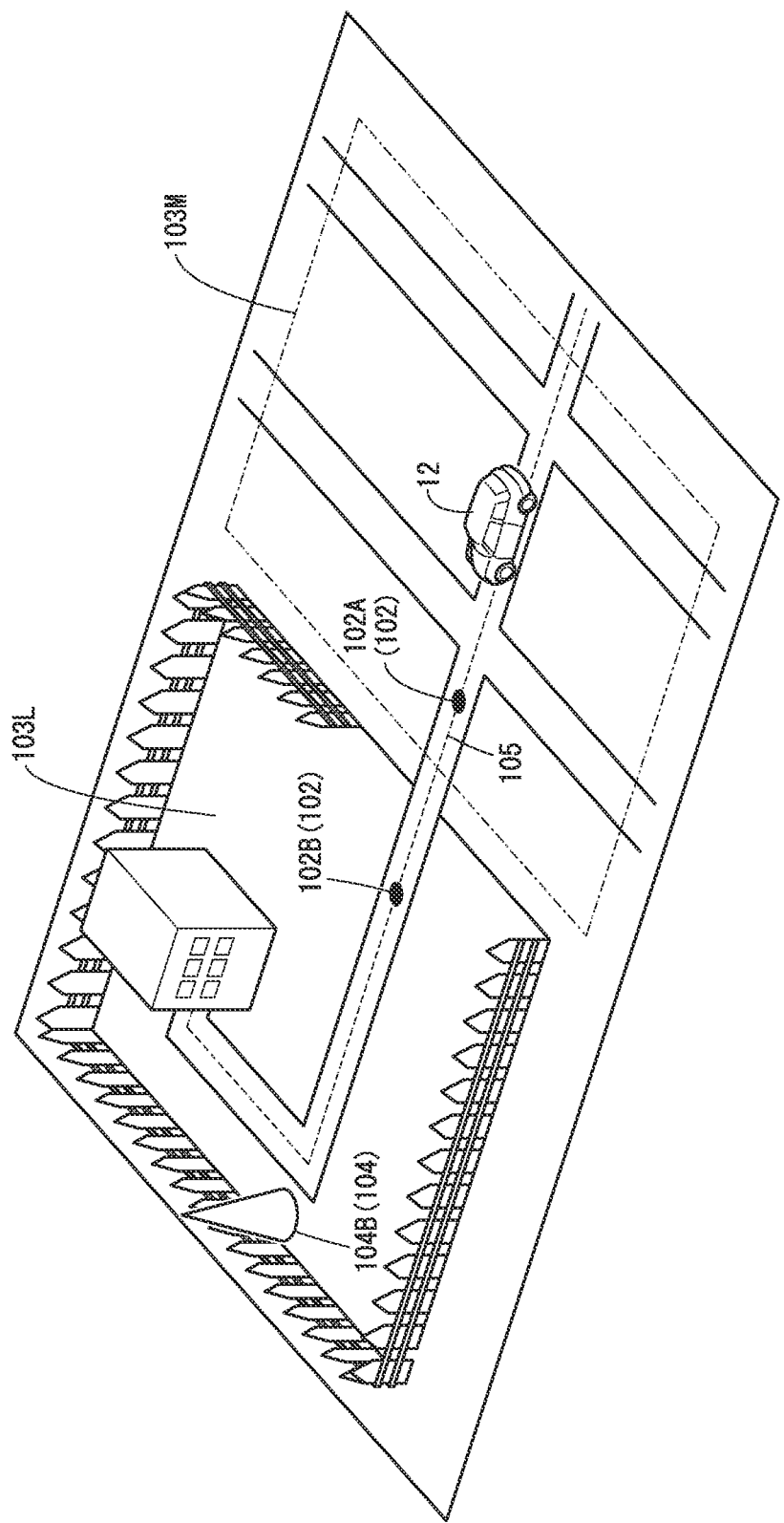
FIG. 6 is a schematic diagram showing an example of the third movement control.

FIG. 6 is a schematic diagram showing an example of the third movement control. FIG. 6 shows a state in which the landmark 104B is positioned in front of the autonomous mobile body 12. In the third movement control, the control unit 58 may cause the autonomous mobile body 12 to travel in a straight course toward the landmark 104B appearing in the acquired image 106 acquired by the image acquisition unit 62. In the case that the autonomous mobile body 12 is caused to travel in a straight course toward the landmark 104B, it is not necessary to calculate the direction in which the autonomous mobile body 12 is made to move, in accordance with the position of the autonomous mobile body 12. For this reason, causing the autonomous mobile body 12 to travel in a straight course toward the landmark 104B can contribute to a reduction in the processing load.

The control unit 58 may issue a notification to the terminal device 16, in the case that the landmark 104 determined in advance appears in the acquired image 106 acquired by the image acquisition unit 62. For example, when the landmark 104 determined in advance has emerged in the acquired image 106, if such a notification is issued to the terminal device 16, the user who is in possession of the terminal device 16 is capable of recognizing based on such a notification that the autonomous mobile body 12 is approaching a position where the landmark 104 can be seen.

The terminal device 16 can be used, for example, for making an order. As the order, there may be cited the delivery of a product or the like, although the present invention is not limited to this feature. The user can make such an order by operating an application screen displayed on the display unit 54 provided in the terminal device 16.

The server device 14 is capable of receiving the order. Based on order information (ordering information) supplied from the terminal device 16, the server device 14 can receive the order from the user. In the case of having received an order from the user, the server device 14 issues a command to the autonomous mobile body 12. Such a command is for the purpose of causing the autonomous mobile body 12 to execute a process in accordance with the order from the user. In the case that the order from the user is for delivery of a product, information indicating the package in which such a product is included, and information indicating a delivery destination for the package can be included in the command. Using the communication unit 42, the server device 14 supplies the command to the autonomous mobile body 12.

Based on the command supplied from the server device 14, the control unit 58 provided in the autonomous mobile body 12 carries out preparations in order to execute a process in accordance with the order from the user. In the case that the order from the user is for delivery of a product, the package in which such a product is included is loaded onto the loading platform 32 provided on the autonomous mobile body 12. The control unit 58 is capable of determining the movement route of the autonomous mobile body 12. Specifically, on the basis of the position information indicating the movement origin (departure point) of the autonomous mobile body 12, the information indicating the movement destination (delivery destination) of the autonomous mobile body 12, and the map information, the control unit 58 is capable of determining the movement route. As noted previously, the main map information 101M and the local map information 101L can be included in the map information. Moreover, it should be noted that the movement route of the autonomous mobile body 12 may be determined by the server device 14. In this case, information indicating the movement route of the autonomous mobile body 12 can be supplied from the server device 14 to the autonomous mobile body 12.

The control unit 58 provided in the autonomous mobile body 12 causes the autonomous mobile body 12 to move along the movement route that has been determined in the manner described above. More specifically, the control unit 58 causes the autonomous mobile body 12 to move from the movement origin to the movement destination.

Figure 7:
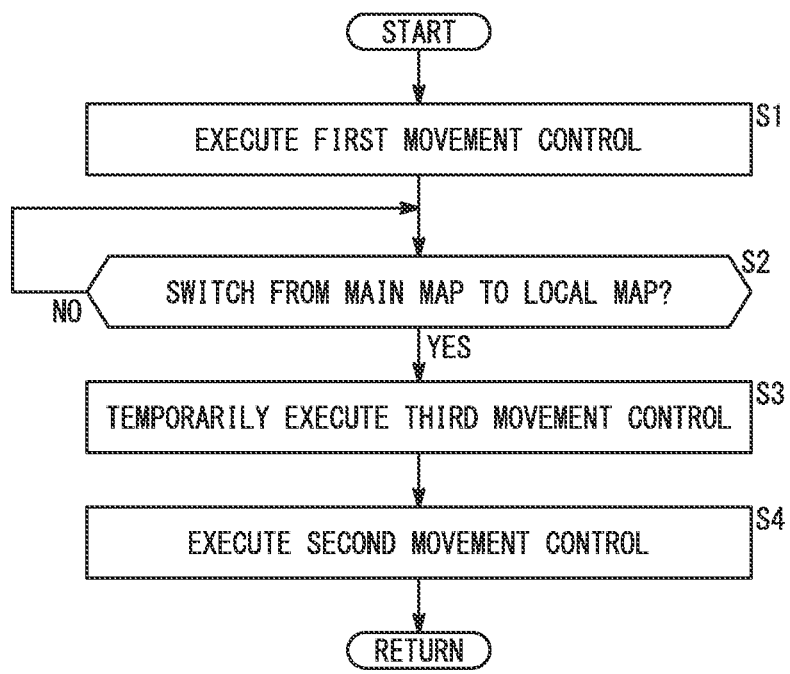
FIG. 7 is a flow chart showing an example of operations of an autonomous mobile body control device according to the embodiment.

Operations of the autonomous mobile body control device according to the present embodiment will be described with reference to FIG. 7. FIG. 7 is a flow chart showing an example of operations of the autonomous mobile body control device according to the present embodiment.

In step S1, the control unit 58 executes the first movement control. The first movement control, as noted previously, is a control for causing the autonomous mobile body 12 to move on the basis of the main map information 101M including the main map 100M.

In step S2, the control unit 58 determines whether or not to switch the map used when causing the autonomous mobile body 12 to move from the main map 100M to the local map 100L. In the case that the map used when causing the autonomous mobile body 12 to move is switched from the main map 100M to the local map 100L (YES in step S2), the process transitions to step S3. In the case that the map used when causing the autonomous mobile body 12 to move is not switched from the main map 100M to the local map 100L (NO in step S2), step S2 is repeated.

In step S3, the control unit 58 temporarily executes the third movement control. The third movement control, as noted previously, is a control for causing the autonomous mobile body 12 to move on the basis of the landmark 104 appearing in the acquired image 106. In the case that the third movement control is completed, the process transitions to step S4.

In step S4, the control unit 58 executes the second movement control. The second movement control, as noted previously, is a control for causing the autonomous mobile body 12 to move on the basis of the local map information 101L including the local map 100L. In this manner, the processing shown in FIG. 7 is executed.

Operations of the autonomous mobile body control device according to the present embodiment will be described with reference to FIG. 8. FIG. 8 is a flow chart showing an example of operations of the autonomous mobile body control device according to the present embodiment.

In step S11, the control unit 58 executes the second movement control. The second movement control, as noted previously, is a control for causing the autonomous mobile body 12 to move on the basis of the local map information 101L including the local map 100L.

In step S12, the control unit 58 determines whether or not to switch the map used when causing the autonomous mobile body 12 to move from the local map 100L to the main map 100M. In the case that the map used when causing the autonomous mobile body 12 to move is switched from the local map 100L to the main map 100M (YES in step S12), the process transitions to step S13. In the case that the map used when causing the autonomous mobile body 12 to move is not switched from the local map 100L to the main map 100M (NO in step S12), step S12 is repeated.

In step S13, the control unit 58 temporarily executes the third movement control. The third movement control, as noted previously, is a control for causing the autonomous mobile body 12 to move on the basis of the landmark 104 appearing in the acquired image 106. In the case that the third movement control is completed, the process transitions to step S14.

In step S14, the control unit 58 executes the first movement control. The first movement control, as noted previously, is a control for causing the autonomous mobile body 12 to move on the basis of the main map information 101M including the main map 100M. In this manner, the processing shown in FIG. 8 is executed.

In this manner, according to the present embodiment, in the case that the map used when causing the autonomous mobile body 12 to move is switched from the main map 100M to the local map 100L, the third movement control is temporarily executed. Further, according to the present embodiment, in the case that the map used when causing the autonomous mobile body 12 to move is switched from the local map 100L to the main map 100M, the third movement control is temporarily executed. The third movement control is a control for causing the autonomous mobile body 12 to move on the basis of the landmark 104 appearing in the acquired image 106. In the third movement control, it is not necessary to use the map information. Therefore, in accordance with the present embodiment, the autonomous mobile body 12 can be made to move smoothly, even in the case that switching of the map used when causing the autonomous mobile body 12 to move is carried out.

Modified Embodiment

The present invention is not limited to the above disclosure, and various modifications are possible without departing from the essence and gist of the present invention.

For example, in the embodiment described above, a case has been described as an example in which a package is delivered by the autonomous mobile body 12, although the present invention is not limited to this feature. For example, the autonomous mobile body 12 may be a lawn mower or the like. For example, in the case that the autonomous mobile body 12 is a lawn mower, the working unit 36 that is provided in the autonomous mobile body 12, for example, is a lawn mowing mechanism for carrying out mowing of the lawn.

Descriptions will be stated below concerning the inventions that can be grasped from the above-described embodiment.

The autonomous mobile body control device (13) comprises the position information acquisition unit (60) that acquires the position information indicating the position of the autonomous mobile body (12) using the satellite positioning system, the image acquisition unit (62) that acquires the acquired image (106) which is an image acquired by the image capturing unit (22) provided in the autonomous mobile body, and the control unit (58) which is capable of executing the first movement control that controls the movement of the autonomous mobile body on the basis of the main map information (101M) including the main map (100M), and the second movement control that controls the movement of the autonomous mobile body on the basis of the local map information (101L) including the local map (100L), wherein, in the case that the map used when causing the autonomous mobile body to move is switched from the main map to the local map, or alternatively, in the case that the map used when causing the autonomous mobile body to move is switched from the local map to the main map, the control unit temporarily executes the third movement control that controls the movement of the autonomous mobile body on the basis of the landmark (104) appearing in the acquired image. According to such a configuration, in the case that the map used when causing the autonomous mobile body to move is switched from the main map to the local map, the third movement control is temporarily executed. Further, according to such a configuration, in the case that the map used when causing the autonomous mobile body to move is switched from the local map to the main map, the third movement control is temporarily executed. The third movement control is a control for causing the autonomous mobile body to move on the basis of the landmark appearing in the acquired image. In the third movement control, it is not necessary to use the map information. Therefore, in accordance with such a configuration, the autonomous mobile body can be made to move smoothly, even in the case that switching of the map used when causing the autonomous mobile body to move is carried out.

In the autonomous mobile body control device described above, the direction information indicating the direction of the landmark that can be seen from the node (102) positioned on the movement route, and the distance information indicating the distance from the node to the landmark may be acquired in advance, and in the third movement control, the control unit may determine the direction of movement of the autonomous mobile body on the basis of the landmark appearing in the acquired image, the direction information, and the distance information.

In the autonomous mobile body control device described above, in the third movement control, the control unit may cause the autonomous mobile body to move on the movement route (105) connecting the one node (102A) positioned inside the area (103M) covered by the main map, and the other node (102B) positioned inside the area (103L) covered by the local map.

In the autonomous mobile body control device described above, in the third movement control, the control unit may cause the autonomous mobile body to travel in a straight course toward the landmark appearing in the acquired image. In the case that the autonomous mobile body is caused to travel in a straight course toward the landmark, it is not necessary to calculate the direction in which the autonomous mobile body is made to move, in accordance with the position of the autonomous mobile body. Therefore, such a configuration can contribute to a reduction in the processing load.

In the autonomous mobile body control device described above, the local map information may be generated by the server device on the basis of the provided information which is information provided from the terminal device (16) to the server device (14).

In the autonomous mobile body control device described above, the provided information may include the provided image (107) provided from the terminal device, and the image capturing position information which is information indicating the position where image capturing has been carried out in order to acquire the provided image, and the landmark, which is extracted from the provided image, may be included in the local map information.

In the autonomous mobile body control device described above, in the case that the landmark that is determined in advance appears in the acquired image, the control unit may issue a notification to the terminal device. In accordance with such a configuration, it is possible for the user to recognize that the autonomous mobile body is approaching a position where the landmark can be seen.

In the autonomous mobile body control device described above, the frequency at which the control based on the acquired image is performed in the second movement control may be higher than the frequency at which the control based on the acquired image is performed in the first movement control.

In the autonomous mobile body control device described above, the local map information may include information indicating the movement rule used when the autonomous mobile body is caused to move inside the area covered by the local map.

In the autonomous mobile body control device described above, the autonomous mobile body may further include the working unit (36) configured to carry out the work determined in advance, and the local map may be a map of the working area where the work is carried out using the working unit.

In the autonomous mobile body control device described above, the local map information may include information indicating the work rule used when the work is carried out.

In the autonomous mobile body control device described above, the local map may be partially combined with the main map.

In the autonomous mobile body control device described above, the autonomous mobile body may further include the loading platform (32) on which the package is loaded.

The autonomous mobile body (12) comprises the above-described autonomous mobile body control device.

The autonomous mobile body control method comprises the step (step S1, step S14) of executing the first movement control that controls the movement of the autonomous mobile body on the basis of the main map information including the main map, the step (step S4, step S11) of executing the second movement control that controls the movement of the autonomous mobile body on the basis of the local map information including the local map, and the step (step S3, step S13) of executing the third movement control that controls the movement of the autonomous mobile body on the basis of the landmark appearing in the acquired image which is an image acquired by the image capturing unit provided in the autonomous mobile body, in the case that the map used when causing the autonomous mobile body to move is switched from the main map to the local map (step S2), or alternatively, in the case that the map used when causing the autonomous mobile body to move is switched from the local map to the main map (step S12).

What is claimed is:

1. An autonomous mobile body control device comprising:
    one or more processors that execute computer-executable instructions stored in memory,
    wherein the one or more processors execute the computer-executable instructions to cause the autonomous mobile body control device to:
    acquire position information indicating a position of an autonomous mobile body using a satellite positioning system;
    acquire an acquired image which is an image acquired by a camera provided in the autonomous mobile body; and
    execute a first movement control that controls movement of the autonomous mobile body on a basis of main map information including a main map, and a second movement control that controls the movement of the autonomous mobile body on a basis of local map information including a local map; and
    temporarily execute a third movement control that controls the movement of the autonomous mobile body on a basis of a landmark appearing in the acquired image in a case that a map used when causing the autonomous mobile body to move is switched from the main map to the local map, or alternatively, in a case that the map used when causing the autonomous mobile body to move is switched from the local map to the main map, wherein a frequency at which a control based on the acquired image is performed in the second movement control is higher than a frequency at which the control based on the acquired image is performed in the first movement control.

2. The autonomous mobile body control device according to claim 1, wherein:
   direction information indicating a direction of the landmark seen from a node positioned on a movement route, and distance information indicating a distance from the node to the landmark are acquired in advance; and
   in the third movement control, a direction of movement of the autonomous mobile body is determined, on a basis of the landmark appearing in the acquired image, the direction information, and the distance information.

3. The autonomous mobile body control device according to claim 1, wherein, in the third movement control, the autonomous mobile body is caused to move on a movement route connecting one node positioned inside an area covered by the main map, and another node positioned inside an area covered by the local map.

4. The autonomous mobile body control device according to claim 1, wherein, in the third movement control, the autonomous mobile body is caused to travel in a straight course toward the landmark appearing in the acquired image.

5. The autonomous mobile body control device according to claim 1, wherein the local map information is generated by a server device on a basis of provided information which is information provided from a terminal device to the server device.

6. The autonomous mobile body control device according to claim 5, wherein:
   the provided information includes a provided image provided from the terminal device, and image capturing position information which is information indicating a position where image capturing has been carried out in order to acquire the provided image; and
   the landmark is extracted from the provided image and is included in the local map information.

7. The autonomous mobile body control device according to claim 1, wherein, in a case that the landmark is determined in advance to appear in the acquired image, a notification is issued to a terminal device.

8. The autonomous mobile body control device according to claim 1, wherein the local map information includes information indicating a movement rule used when the autonomous mobile body is caused to move inside an area covered by the local map.

9. The autonomous mobile body control device according to claim 1, wherein
   the local map is a map of a working area where the work is carried out by the autonomous mobile body.

10. The autonomous mobile body control device according to claim 9, wherein the local map information includes information indicating a work rule used when the work is carried out.

11. The autonomous mobile body control device according to claim 1, wherein the local map is partially combined with the main map.

12. The autonomous mobile body control device according to claim 1, wherein the autonomous mobile body further includes a loading platform on which a package is loaded.

13. An autonomous mobile body comprising an autonomous mobile body control device,
   the autonomous mobile body control device including:
   one or more processors that execute computer-executable instructions stored in memory,
   wherein the one or more processors execute the computer-executable instructions to cause the autonomous mobile body control device to:
   acquire position information indicating a position of an autonomous mobile body using a satellite positioning system;
   acquire an acquired image which is an image acquired by a camera provided in the autonomous mobile body; and
   execute a first movement control that controls movement of the autonomous mobile body on a basis of main map information including a main map, and a second movement control that controls the movement of the autonomous mobile body on a basis of local map information including a local map; and
   temporarily execute a third movement control that controls the movement of the autonomous mobile body on a basis of a landmark appearing in the acquired image, in a case that a map used when causing the autonomous mobile body to move is switched from the main map to the local map, or alternatively, in a case that the map used when causing the autonomous mobile body to move is switched from the local map to the main map,
   wherein a frequency at which a control based on the acquired image is performed in the second movement control is higher than a frequency at which the control based on the acquired image is performed in the first movement control.

14. An autonomous mobile body control method comprising:
   executing a first movement control that controls movement of an autonomous mobile body on a basis of main map information including a main map;
   executing a second movement control that controls the movement of the autonomous mobile body on a basis of local map information including a local map; and
   executing a third movement control that controls the movement of the autonomous mobile body on a basis of a landmark appearing in an acquired image which is an image acquired by a camera provided in the autonomous mobile body, in a case that a map used when causing the autonomous mobile body to move is switched from the main map to the local map, or alternatively, in a case that the map used when causing the autonomous mobile body to move is switched from the local map to the main map,
   wherein a frequency at which a control based on the acquired image is performed in the second movement control is higher than a frequency at which the control based on the acquired image is performed in the first movement control.

* * * * *